March 24, 1964 M. W. GREY ETAL 3,126,235

REVOLVING FILE

Filed Aug. 15, 1962 2 Sheets-Sheet 1

INVENTORS
MIKE W. GREY, &
BY WELDON L. EWERT

Victor J. Evans & Co.
Attorneys

REVOLVING FILE

Filed Aug. 15, 1962

INVENTORS
MIKE W. GREY, &
BY WELDON L. EWERT

Victor J. Evans & Co.
Attorneys 3,126,235
REVOLVING FILE
Mike W. Grey, Box 217, and Weldon L. Ewert, Box 694, both of Hooker, Okla.
Filed Aug. 15, 1962, Ser. No. 217,128
1 Claim. (Cl. 312—189)

The present invention relates to files generally and in particular to a revolving file for cards.

Presently employed in pharmaceutical establishments are file cards for recording prescriptions. It is a general practice of the personnel employed in such establishments to keep on hand certain of the prescriptions which are refillable and to file away other prescriptions which may or may not be refillable according to the physicians' orders.

The files kept by such establishments leave much to be desired in that the cards or prescriptions are numerous, are frequently misfiled in the presently used file equipment, and are not instantly available to the establishment personnel when such record is required.

An object of the present invention therefore is to provide a revolving file for prescriptions for use in a pharmaceutical establishment which enables the establishment personnel to quickly and with facility find and refer to any prescription filed in the device of the present invention.

Another object of the present invention is to provide a revolving file having removable file units which may be stored in an out of use condition but may be with facility re-inserted into the revolving file for re-reference of a particular card or prescription.

A further object of the present invention is to provide a revolving file which occupies little space, one which is neat and attractive in appearance, one which may be manufactured in such sizes as to accommodate prescription blanks of various sizes, one which may be manufactured in quantity at reasonable cost, and one which is highly effective in action.

Figure 1:
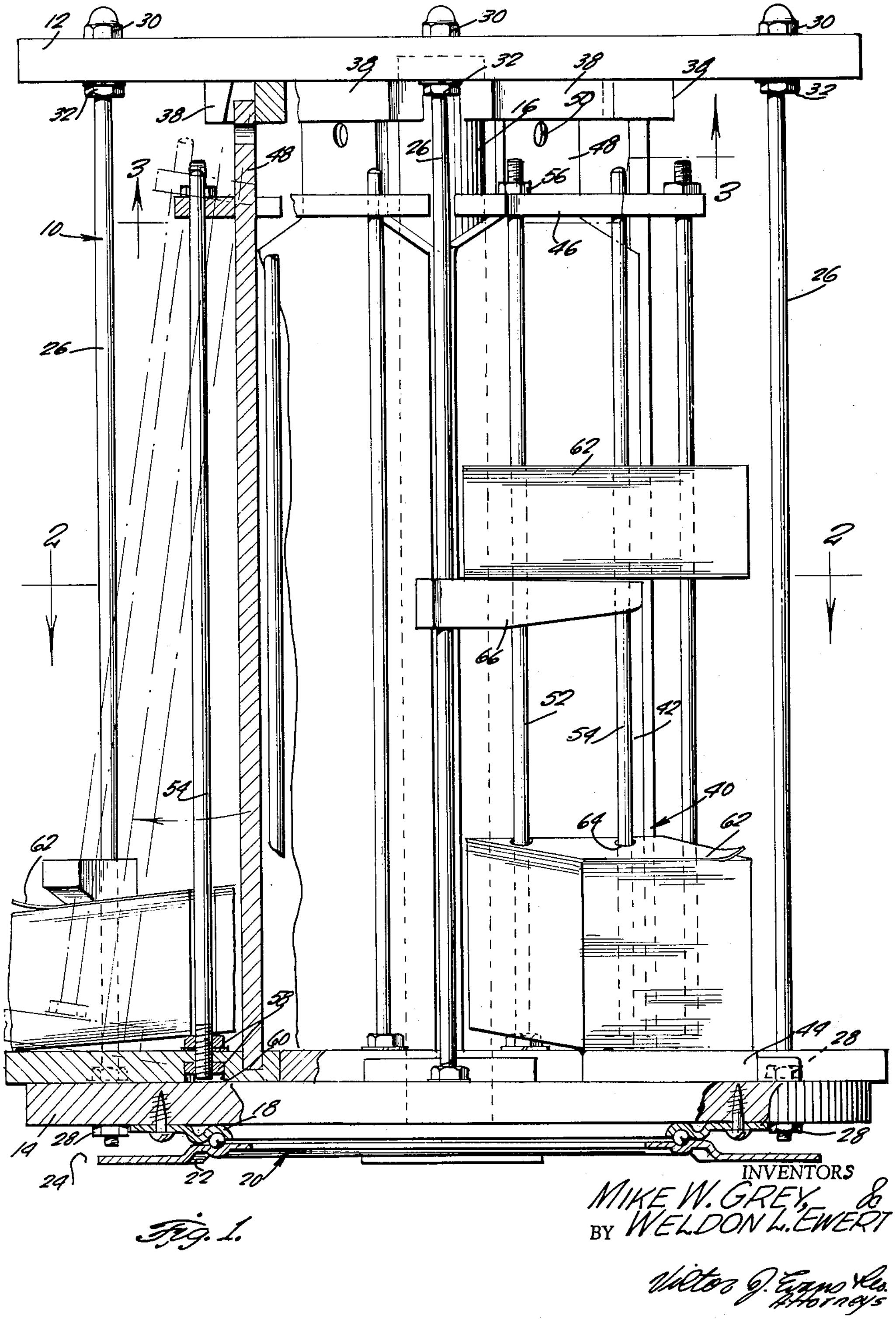
Figures 2, 3, 4:
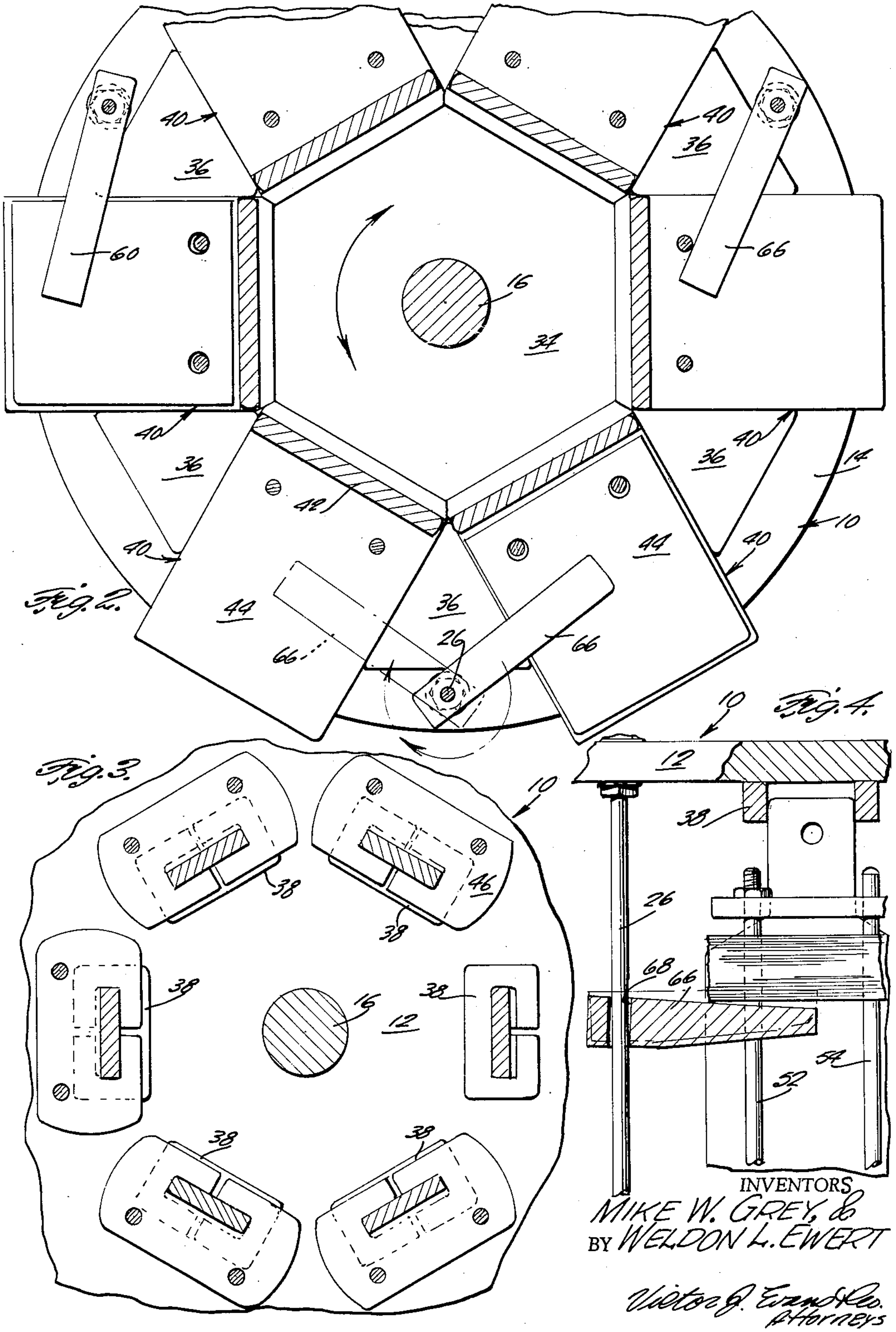

With these objects in mind the invention may be described as follows and with reference to the attached drawings, in which like numerals indicate like parts throughout the several views and in which:

FIGURE 1 is an elevational view of the revolving file according to the present invention showing in dotted lines, how one of the file units is inserted into or withdrawn from the file, FIGURE 2 is a view taken on the line 2—2 of FIGURE 1, FIGURE 3 is a view taken on the line 3—3 of FIGURE 1, and FIGURE 4 is a detailed view showing how the prescription cards of a file unit may be kept separated.

With reference to the drawings in detail, the reference numeral 10 designates generally the file of the present invention and it is seen, in FIGURE 1, to comprise a first disc 12 and a second disc 14 arranged in super-imposed spaced relation. A shaft or hub 16 connects the discs 12 and 14 together and with the discs 12 and 14 forms a drum which is upended. The disc 14 has one section 18 of a turntable 20 secured to it while the other section 22 of the turntable 20 is adapted to rest upon a supporting surface, as at 24 in FIGURE 1.

The discs 12 and 14 are parallel and spaced from each other and between them extend spaced rods 26 each having its lower end secured to the disc 14 by spaced nuts 28 and each having its upper end secured to the disc 12 by other spaced nuts 30 and 32.

The disc 14 has on its upper face a block 34 having fixed sides as shown most clearly in FIGURE 2. Arranged in spaced relation about the block 34 are triangular blocks 36 arranged so that their apices point toward the junction of two adjacent sides of the block 34.

The blocks 36 together with the blocks 34 defines a plurality of open ended recesses arranged about the upper surface of the disc 14 with the open ends facing outwardly of the periphery of the disc 14.

With reference to FIGURE 4 it will be seen that the underside of the disc 12 is provided with a downwardly facing socket 38. In FIGURE 1 it will be seen that there are a plurality of such sockets 38 arranged in spaced relation about the hub 16.

An important feature of the present invention resides in the use of a plurality of removable file units, each designated generally by the reference numeral 40.

Each unit 40 comprises an elongated base 42 having a first upright abutment 44 fixedly secured at one end and a second upright abutment 46 removably supported upon the portion of the base 42 inwardly of and spaced from the other end.

As shown in FIGURE 1, the units 40 each have the end portion adjacent the abutment 46 formed to a tongue 48. The tongue 48 of each unit 40 is provided with a hole 50 by means of which the unit 40 may be hung upon a supporting hook or nail when removed from the drum formed by the discs 12 and 14.

A pair of guide rods 52 and 54 extend between and through the abutments 44 and 46, the one guide rod 52 being provided with a threaded end portion on which a nut 56 is threaded for securing the abutment 46 snugly on the shoulder provided between the main body portion of the base 42 and the tongue 48.

Other nuts 58 secure the other ends of the guide rods 52 and 54 to the associated abutment 44, there being provided countersunk holes, as at 60 in FIGURE 1 for the nut 58 on the lower end of the associated rod 52 or 54.

A plurality of cards 62 are provided with holes, as at 64 in FIGURE 1, which permit the threading of the cards in stacked relation on the rods 52 and 54 in the conventional manner associated with file cards in file drawers or the like.

An important feature of the present invention consists in a lug or rider 66 having a hole 68 extending therethrough and receiving one of the rods 26, as shown most clearly in FIGURE 4. The hole 68 is of a size greater than the thickness of the rod 26 and the lug 66 is employed to hold a selected card or group of cards 62 in separated condition on the unit 40. The oversized hole 68 of the lug 66 permtis it to be shifted from the dotted line position in FIGURE 4 to the full line position in which it wedges itself on the rod 26 and holds the uppermost group of cards 62 separated from the lowermost group of cards in the unit 40, as in FIGURE 1.

In use, each of the units 40 is with ease and facility inserted into the drum between the discs 12 and 14 with the tongue 48 of each unit insertable into and withdrawable from the adjacent socket 38 and with the abutment 44 inserted between the triangular blocks 36 and the adjacent face of the block 34 which form a recess for the abutment 44.

As indicated in dotted lines in FIGURE 2, each lug 66 may serve two units 40 and each lug 66 may be used to separate a group of cards 62 when raised by hand from a selected card 62 which is therefore exposed on its upper face to the user of the file of the present invention for copying the material or other use of the data inscribed upon the upper face of such card 62, it being most useful as a prescription card in a pharmaceutical establishment.

Each file unit 40 may be quickly and with facility removed from the file and laid flat upon a table for the insertion of other cards. This is done by unscrewing the nut 56 and removing the abutment 46 from the unit so as to expose the free ends of the rods 52 and 54 for placing thereon other prescription cards as wanted.

It will be seen therefore that the revolving file of the present invention provides a handy and efficient manner of keeping prescriptions readily available to pharmacists or other person having use for the same, the prescription cards being easily replaced, the units being easily installed and removed from the drum, and the units themselves being conveniently shaped for compact storage away from the drum when desired.

While only a prefered embodiment of the present invention is shown and described, it is contemplated that many changes and modifications may be made according to production demands, or other factors, without departing from the spirit of the invention as set forth in the appended claim.

What is claimed is:

In a revolving file including a rotatable turntable adapted to rest upon a supporting surface, a drum having spaced parallel discs and a hub connecting said discs together, said drum being disposed with said discs in vertical spaced relation and with one of said discs connected to said turntable for rotation therewith, a plurality of card holding file units each comprising an elongated base, an upright first abutment secured to one end of said base, an upright second abutment disposed inwardly of and adjacent the other end of said base and removably secured thereto, said first and second abutments being laterally extending, at least one guide rod extending between said first and second abutments, a plurality of cards each having a hole therethrough disposed in stacked relation on said base with said rod extending through the holes of said cards, said drum one disc having on the upper face thereof a plurality of spaced opened ended recesses each of a size to receive therein the first abutment of one of said file units when upended and inserted between said discs with the underface of the base of said unit facing said hub, and means operatively connected to said drum and adapted to hold a selected card or group of cards of a file unit above and spaced from said first abutment when said file unit is upended and inserted between said discs, said means including a rod extending between said discs and a lug freely slidable on said rod, said lug wedgingly engaging said rod when supporting a card or group of cards on a file unit when said file unit is upended and inserted between said discs.

References Cited in the file of this patent

UNITED STATES PATENTS

| | | |
|---|---|---|
| 2,243,320 | Sears | May 27, 1941 |
| 2,383,944 | Saltz | Sept. 4, 1945 |
| 2,716,410 | O'Hara | Aug. 30, 1955 |
| 3,002,796 | Dahm | Oct. 3, 1961 |